US009225490B2

(12) United States Patent
Koivisto et al.

(10) Patent No.: US 9,225,490 B2
(45) Date of Patent: Dec. 29, 2015

(54) METHOD AND APPARATUS FOR CONFIGURING RESOURCE ELEMENTS FOR THE PROVISION OF CHANNEL STATE INFORMATION REFERENCE SIGNALS

(71) Applicant: Broadcom Corporation, Irvine, CA (US)

(72) Inventors: Tommi Koivisto, Espoo (FI); Mihai Enescu, Espoo (FI)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/801,362

(22) Filed: Jul. 16, 2015

(65) Prior Publication Data

US 2015/0326364 A1    Nov. 12, 2015

Related U.S. Application Data

(63) Continuation of application No. 14/069,910, filed on Nov. 1, 2013, now abandoned, which is a continuation of application No. PCT/IB2012/052173, filed on May 1, 2012, which is a continuation of application No. 13/098,873, filed on May 2, 2011, now Pat. No. 8,289,917.

(30) Foreign Application Priority Data

May 3, 2011    (GB) .................................. 1107363.2
Sep. 1, 2011    (GB) .................................. 1115130.5

(51) Int. Cl.
*H04W 4/00*    (2009.01)
*H04L 5/00*    (2006.01)
*H04W 72/04*    (2009.01)

(52) U.S. Cl.
CPC ............ *H04L 5/0051* (2013.01); *H04L 5/0035* (2013.01); *H04W 72/048* (2013.01)

(58) Field of Classification Search
None
See application file for complete search history.

(56) References Cited

U.S. PATENT DOCUMENTS

| | | |
|---|---|---|
| 2011/0170435 A1 | 7/2011 | Kim et al. |
| 2011/0176634 A1 | 7/2011 | Yoon et al. |
| 2011/0252139 A1 | 10/2011 | Bhattad et al. |
| 2011/0317641 A1 | 12/2011 | Noh et al. |
| 2012/0014349 A1 | 1/2012 | Chung et al. |
| 2012/0039220 A1 | 2/2012 | Chen et al. |

(Continued)

FOREIGN PATENT DOCUMENTS

WO    WO 2011/044172 A2    4/2011

OTHER PUBLICATIONS

International Search Report and Written Opinion issued Oct. 5, 2012 in PCT/IB2012/052173 filed May 1, 2012.

(Continued)

*Primary Examiner* — Kibrom T Hailu
(74) *Attorney, Agent, or Firm* — Oblon, McClelland, Maier & Neustadt, L.L.P.

(57) ABSTRACT

Methods, apparatus and computer program products define additional resource elements of a physical resource block (PRB) to be allocated for the provision of channel state information reference signals in a manner that does not create issues relating to backwards compatibility for legacy mobile terminals. A method may include receiving a definition of a plurality of resource elements of a PRB to be allocated for provision of channel state information reference signals. At least some of the plurality of resource elements of the PRB that are allocated for the provision of channel state information reference signals correspond in position to resource elements of the PRB that are interpreted by a different type of mobile terminal to be muted. The method also causes channel state information reference signals to be received via the plurality of resource elements of the PRB that are allocated for the provision of channel state information reference signals.

20 Claims, 15 Drawing Sheets

(56) References Cited

U.S. PATENT DOCUMENTS

| | | | |
|---|---|---|---|
| 2012/0058791 | A1 | 3/2012 | Bhattad et al. |
| 2012/0113917 | A1 | 5/2012 | Gaal et al. |
| 2012/0120891 | A1 | 5/2012 | Mazzarese et al. |
| 2012/0176982 | A1 | 7/2012 | Zirwas et al. |
| 2012/0213261 | A1 | 8/2012 | Sayana et al. |
| 2012/0281556 | A1 | 11/2012 | Sayana et al. |
| 2013/0044685 | A1 | 2/2013 | Fong et al. |
| 2013/0094411 | A1 | 4/2013 | Zhang |

OTHER PUBLICATIONS

"CSI RS configuration to support 4 Tx MIMO Ue in 8 Tx networks", NTT DOCOMO, 3GPP Draft; RI-110861 R2-111301 CSI RS Signalling, (3GPP), vol. RAN WG2, XP050493626, Feb. 15, 2011.

"Muting aspects and Intercell CSI-RS design", LG Electronics, 3GPP, vol. R1-103733, TSG-RAN WG1 Meeting #61 bis, XP050449164, Jun. 28-Jul. 2, 2010, 6 pages.

Combined Search and Examination Report for corresponding GB Application No. 1107363.2, Jul. 6, 2011, 5 Pages.

Combined Search and Examination Report for corresponding GB Application No. 1115130.5, Oct. 7, 2011, 5 Pages.

"Details of eICrC in Marco-Pico case." 3GPP TSG RAN WG 1 Meeting #63, Nov. 19, 2010, 5 Pages.

Applicant's Response to Combined Search and Examination Report for corresponding GB Application No. 1115130.5, Dec. 6, 2011, 64 Pages.

Notification of Allowance for corresponding GB Application No. 1115130.5, Dec. 28, 2011, 1 Page.

|   | 0 | 1 | 2 | 3 | 4 | 5 | 6 | 7 | 8 | 9 | 10 | 11 |
|---|---|---|---|---|---|---|---|---|---|---|---|---|
|   |   |   |   |   | $0_a$ | $1_a$ |   | $0_c$ | $1_c$ |   |   |   |
|   |   |   |   |   |   |   |   | $0_d$ | $1_d$ |   | $0_f$ | $1_f$ |
|   |   |   |   |   | $0_b$ | $1_b$ |   | $0_e$ | $1_e$ |   | $0_g$ | $1_g$ |
|   |   |   |   |   | $2_a$ | $3_a$ |   | $2_c$ | $3_c$ |   |   |   |
|   |   |   |   |   |   |   |   | $2_d$ | $3_d$ |   | $2_f$ | $3_f$ |
|   |   |   |   |   | $2_b$ | $3_b$ |   | $2_e$ | $3_e$ |   | $2_g$ | $3_g$ |
|   |   |   |   |   | $4_a$ | $5_a$ |   | $4_c$ | $5_c$ |   |   |   |
|   |   |   |   |   |   |   |   | $4_d$ | $5_d$ |   | $4_f$ | $5_f$ |
|   |   |   |   |   | $4_b$ | $5_b$ |   | $4_e$ | $5_e$ |   | $4_g$ | $5_g$ |
|   |   |   |   |   | $6_a$ | $7_a$ |   | $6_c$ | $7_c$ |   |   |   |
|   |   |   |   |   |   |   |   | $6_d$ | $7_d$ |   | $6_f$ | $7_f$ |
|   |   |   |   |   | $6_b$ | $7_b$ |   | $6_e$ | $7_e$ |   | $6_g$ | $7_g$ |

$\boxed{X_y}$ CSI-RS

Figure 3b

METHOD AND APPARATUS FOR CONFIGURING RESOURCE ELEMENTS FOR THE PROVISION OF CHANNEL STATE INFORMATION REFERENCE SIGNALS

CROSS REFERENCE TO RELATED APPLICATIONS

This application is a continuation of U.S. application Ser. No. 14/069,910 filed Nov. 1, 2013 which is a bypass continuation of International Application No. PCT/IB2012/052173, filed May 1, 2012, which claims priority to U.S. application Ser. No. 13/098,873, filed May 2, 2011, and also claims priority to GB Application No. 1107363.2, filed May 3, 2011. This application also claims priority to GB Application No. 1115130.5, filed Sep. 1, 2011, the entire contents of which are hereby incorporated by reference.

FIELD OF THE INVENTION

Embodiments of the present invention relate generally to communications technology and, more particularly, to methods and apparatus for defining a plurality of resource elements for the provision of channel state information reference signals.

BACKGROUND OF THE INVENTION

Some wireless communications systems utilize multiple-input and multiple-output (MIMO) technology. MIMO technology involves the use of multiple antennas for both the transmitter and a receiver so as to improve communication performance, such as by offering significant increases in data throughput and link range without additional bandwidth or transmit power as a result of its higher spectral efficiency as measured, for example, in bits per second per hertz of bandwidth, and link reliability or diversity. For example, systems that operate in accordance with Releases 8, 9 and 10 of the Long Term Evolution (LTE) specification support MIMO, that is, MIMO transmissions from a transmit point (which can be also represented by a base station, such as a evolved node B(eNB)), to one or more mobile terminals. Indeed, Releases 8 and 9 of the LTE specification support four stream transmission, which could result in 4×4 MIMO in the context of four transmission (Tx) antennas and four reception antennas. In addition, one stream and two stream beamforming from a maximum of 8Tx antennas have been introduced in Release 8 and Release 9, respectively. Release 10 of the LTE specifications extends support for downlink MIMO for up to eight stream transmissions and therefore up to at least 8×8 MIMO in the context of eight transmission antennas and eight reception antennas. Additionally, Release 10 of the LTE specification provides enhanced support for multi-user MIMO as well as support for seamless switching between single and multi-user MIMO.

To facilitate closed-loop MIMO communications, reference signals may be used for channel state information estimation. This is especially valid in frequency division duplexing (FDD) systems where channel reciprocity cannot be exploited, as it is the case in time division duplexing (TDD). For example, in the context of downlink MIMO, channel state information feedback may be provided via channel state information reference signals from a mobile terminal to the transmit point. The channel state information reference signals may be transmitted periodically, may have a low overhead and high reuse factors, especially in instances in which the number of transmission antennas is relatively low. Reference signals are mapped to the transmit point antenna ports. Antenna ports may have a one to one mapping to the physical transmit antennas of the transmit point, or may characterize multiple transmit antennas of one transmit point. Indeed, Release 10 of the LTE specification includes channel state information reference signals (CSI-RS) as well as physical downlink shared channel (PDSCH) resource element (RE) muting, which complement the CSI-RS operation in an instance in which accurate inter-cell channel estimation is desired. All LTE Releases make use also of Common Reference Signals (CRS) which are sent in every subframe and may characterize a maximum of 4 antenna ports.

By way of example, FIG. 1 illustrates resource elements usage for normal cyclic prefix (CP) in frame structure type 1 (which applies to FDD) as specified in Release 10 of the LTE specification for one physical resource block (PRB). As shown in FIG. 1, resource elements, that is, respective elements of the orthogonal frequency division multiplexing (OFDM) time frequency grid represented by the PRB, may be allocated for common reference signals (CRS) ports #1 and #2, CRS ports #3 and #4, demodulation reference signal (DMRS), port #5 if so configured for Release 8 of the LTE specifications, DMRS for Releases 9 and 10 of the LTE specifications, physical downlink control channel (PDCCH) and physical downlink shared channel (PDSCH). The physical resource block also includes resource elements allocated for CSI-RS. In this regard, the CSI-RS resource elements are designated with numbers, e.g., 0, 1, . . . 7, with the alphabetical suffixes, e.g., a, b, . . . t, indicating the different transmit points to which the CSI-RS resource elements are directed. For example, the $0_b, 1_b$ resource elements are a pair of CSI-RS resource elements mapped to the transmit antennas of a transmit point. They can be indicated in a dedicated way to one or more mobile terminals.

The density of the CSI-RS pattern in accordance with Release 10 of the LTE specification is one CSI-RS resource element per antenna port per PRB. By way of example, FIG. 1 illustrates the PRBs for two antenna ports, four antenna ports and eight antenna ports with two REs, four REs and eight REs allocated for CSI-RS, respectively. Similarly, FIG. 2 illustrates the CSI-RS pattern for extended CP in frame structure type 1 (FDD) specified in Release 10 of the LTE specification for one PRB. As described above in conjunction with FIG. 1, FIG. 2 illustrates the PRBs for two antenna ports, four antenna ports and eight antenna ports. Further, FIG. 3a illustrates the CSI-RS pattern for normal CP in frame structure type 2 (which applies to TDD), while FIG. 3b illustrates the CSI-RS pattern for extended CP in frame structure type 2 (TDD) with these patterns being utilized in addition to the patterns utilized for frame structure type 1, as shown in FIGS. 1 and 2.

PDSCH RE muting is used in a complementary way to the CSI-RS if accurate inter-transmit points channel state information is desired. The same CSI-RS patterns are used for the muted REs.

The density of one RE for CSI-RS per PRB per port may be sufficient for single-cell CSI estimation which may, in turn, allow the base station to control the antenna weights to achieve a precoding gain. However, it may be desired for the mobile terminal to provide feedback information not only regarding CSI estimation, but also regarding interference, such as the interference covariance matrix that may be required for channel quality indication (CQI) and rank estimation. In this regard, the density of one resource element for CSI-RS per PRB per port may be insufficient for interference covariance estimation or, at least, may lead to an undesirably large error in the estimation of the interference covariance which, in turn, may cause erroneous CQI and erroneous rank feedback which may lead to a poor selection of transmission scheme, both modulation and coding scheme (MCS) and rank, by the base station. These poor selections may, in turn, lead to throughput loss at the system level.

In Release 10 of the LTE specification, the mobile terminal may rely on CRS for interference estimation. However, CRS may have a reuse factor of 3 with two or more transmission antennas such that CRS collisions of neighboring cells are unlikely to be avoided. This scenario may cause less accurate CQI and rank estimation in typical fractional load scenarios than is desired. Thus, CQI and rank estimation could benefit by the use of CSI-RS. However, the current CSI-RS density is too low to provide the desired channel state information/interference accuracy.

Furthermore, there is an ongoing effort to support heterogeneous networks which exhibit difficult interference characteristics. Thus, there is a tendency in $3^{rd}$ Generation Partnership Project (3GPP) networks to reduce CRS usage, as CRS may be problematic from the inter-cell interference perspective. In a backwards compatible manner, this CRS reduction can be accomplished, for example, with Multimedia Broadcast over a Single Frequency Network (MBSFN) sub-frames or by the definition of new extension carriers (without CRS) in relation to carrier aggregation. Additionally, the reference signals provided by release 10 of the LTE specifications, such as the CSI-RS, have a relatively low overhead with respect to CRS, which provides a further incentive to limit the role of CRS going forward. Additionally, in transmission mode 9 of Release 10 of the LTE specification, the number of CRS can be adjusted by turning off some of the ports, thereby potentially leading to the utilization of only one CRS port at a minimum. As such, it cannot be assumed that the mobile terminal will always have sufficient CRS to perform interference estimation in the future.

Coordinated multi-point transmission (CoMP) will require a mobile terminal to measure from the CSI-RS the channel from transmission points that are geographically separated from a reference transmission point, such as a serving cell. These measurements may include propagation delay differences that show up in the effective frequency-domain channel as an additional linear phase rotation. Thus, the mobile terminal may be required to estimate a more frequency-selective channel and/or to estimate the timing differences between the different transmission points. Such estimation and the subsequent feedback to the base station would also require more use of the reference signals, such as the CSI-RS, and a greater density of the reference signals within a PRB.

Notwithstanding the potential for increased utilization of the CSI-RS, efforts to simply increase the density of the reference signals, such as the CSI-RS, within a PRB in order to support the additional feedback that is desired creates backwards compatibility issues with legacy mobile terminals, such as those mobile terminals that operate in accordance with prior releases of a respective specification. In this regard, since these legacy mobile terminals would not be aware of the additional reference signal transmissions, such as the additional CSI-RS, the additional reference signal transmissions may disadvantageously interfere with data transmissions of the legacy mobile terminals.

SUMMARY OF THE INVENTION

Methods, apparatus and computer program products are provided according to an example embodiment for defining additional resource elements of a physical resource block (PRB) to be allocated for the provision of channel state information reference signals in a manner that does not create issues relating to backwards compatibility for legacy mobile terminals, such as those that operate in accordance with Release 10 of the LTE specification. In one example, the methods, apparatus and computer program products increase the density of the resource elements of a PRB that are allocated for the provision of channel state information reference signals, such as the CSI-RS density, so as to facilitate the provision of additional reference signals including, for example, channel estimation and feedback relating to interference covariance estimation.

In one embodiment, a method is provided that includes receiving a definition of a plurality of resource elements of a physical resource block (PRB) to be allocated for provision of channel state information reference signals by a mobile terminal. At least some of the plurality of resource elements of the PRB that are allocated for the provision of channel state information reference signals correspond in position to resource elements that are configured to be interpreted as muted by a different type of mobile terminal. The method of this embodiment also causes channel state information reference signals to be received via the plurality of resource elements of the PRB that are allocated for the provision of channel state information reference signals.

In another embodiment, an apparatus is provided that includes a processing system, e.g. in the form of at least one processor and at least one memory including computer program code, and which is arranged to cause the apparatus at least to receive a definition of a plurality of resource elements of a physical resource block (PRB) to be allocated for provision of channel state information reference signals by a mobile terminal. At least some of the plurality of resource elements of the PRB that are allocated for the provision of channel state information reference signals correspond in position to resource elements that are configured to be interpreted as muted by a different type of mobile terminal. The processing system is also arranged to cause the apparatus to cause channel state information reference signals to be received via the plurality of resource elements of the PRB that are allocated for the provision of channel state information reference signals.

In a further embodiment, a computer program product is provided in the form of a computer readable medium that comprises a set of instructions, which, when executed by a computing system, causes the computing system to perform the step of receiving a definition of a plurality of resource elements of a physical resource block (PRB) to be allocated for provision of channel state information reference signals by a mobile terminal. At least some of the plurality of resource elements of the PRB that are allocated for the provision of channel state information reference signals correspond in position to resource elements that are configured to be interpreted as muted by a different type of mobile terminal. The set of instructions also cause the computing system to perform the step of causing channel state information reference signals to be received via the plurality of resource elements of the PRB that are allocated for the provision of channel state information reference signals.

In yet another embodiment, an apparatus is provided that includes means for receiving a definition of a plurality of resource elements of a physical resource block (PRB) to be allocated for provision of channel state information reference signals by a mobile terminal. At least some of the plurality of resource elements of the PRB that are allocated for the provision of channel state information reference signals correspond in position to resource elements that are configured to be interpreted as muted by a different type of mobile terminal.

The apparatus of this embodiment also includes means for causing channel state information reference signals to be received via the plurality of resource elements of the PRB that are allocated for the provision of channel state information reference signals.

In one embodiment, a method is provided that includes defining one or more first resource elements of a physical resource block (PRB) to be allocated for provision of channel state information reference signals for a first type of mobile terminal. The method of this embodiment also defines one or more second resource elements of the PRB to be interpreted as muted by the first type of mobile terminal. The method involves defining a plurality of resource elements of the PRB to be allocated for provision of channel state information reference signals for a second type of mobile terminal. At least some of the plurality of resource elements of the PRB that are allocated for the provision of channel state information reference signals correspond in position to the second resource elements of the PRB, thereby overlapping in one embodiment on exactly the same positions as the muted resource elements of the first type of mobile terminal.

In another embodiment, an apparatus is provided that includes a processing system, e.g. in the form of at least one processor and at least one memory including computer program code, the processing system being arranged to cause the apparatus at least to define one or more first resource elements of a physical resource block (PRB) to be allocated for provision of channel state information reference signals for a first type of mobile terminal. The processing system is arranged to define one or more second resource elements of the PRB to be interpreted as muted by the first type of mobile terminal and to cause the apparatus to define a plurality of resource elements of the PRB to be allocated for provision of channel state information reference signals for a second type of mobile terminal. At least some of the plurality of resource elements of the PRB that are allocated for the provision of channel state information reference signals correspond in position to the second resource elements of the PRB, thereby overlapping in one embodiment on exactly the same positions as the muted resource elements of the first type of mobile terminal.

In a further embodiment, a computer program product is provided that comprises a computer readable medium comprising a set of instructions, which, when executed by a computing system, causes the computing system to perform the steps of defining one or more first resource elements of a physical resource block (PRB) to be allocated for provision of channel state information reference signals for a first type of mobile terminal, and defining one or more second resource elements of the PRB to be interpreted as muted by the first type of mobile terminal. The set of instructions also cause the computing system to define a plurality of resource elements of the PRB to be allocated for provision of channel state information reference signals for the second type of mobile terminal. At least some of the plurality of resource elements of the PRB that are allocated for the provision of channel state information reference signals correspond in position to the second resource elements of the PRB, thereby overlapping in one embodiment on exactly the same positions as the muted resource elements of the first type of mobile terminal.

In yet another embodiment, an apparatus is provided that includes means for defining one or more first resource elements of a physical resource block (PRB) to be allocated for provision of channel state information reference signals for a first type of mobile terminal. The apparatus of this embodiment also includes means for defining one or more second resource elements of the PRB to be interpreted as muted by the first type of mobile terminal. The apparatus also includes means for defining a plurality of resource elements of the PRB to be allocated for provision of channel state information reference signals for the second type of mobile terminal. At least some of the plurality of resource elements of the PRB that are allocated for the provision of channel state information reference signals correspond in position to the second resource elements of the PRB, thereby overlapping in one embodiment on exactly the same positions as the muted resource elements of the first type of mobile terminal.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
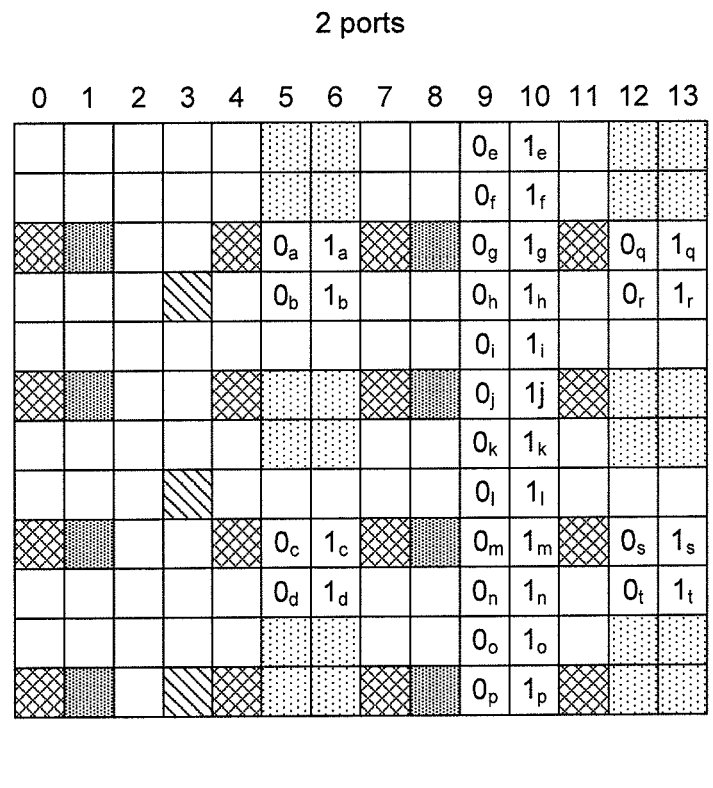
Figure 1:
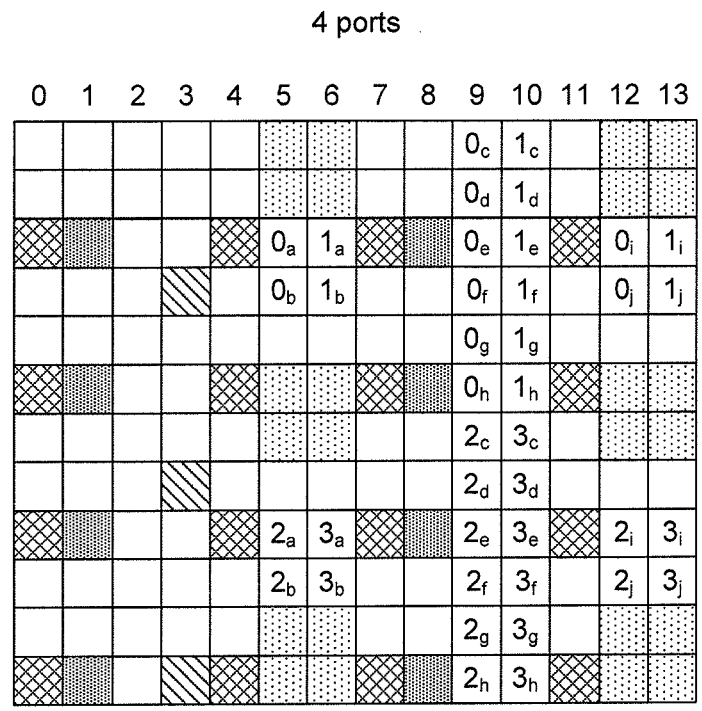
Figure 1:
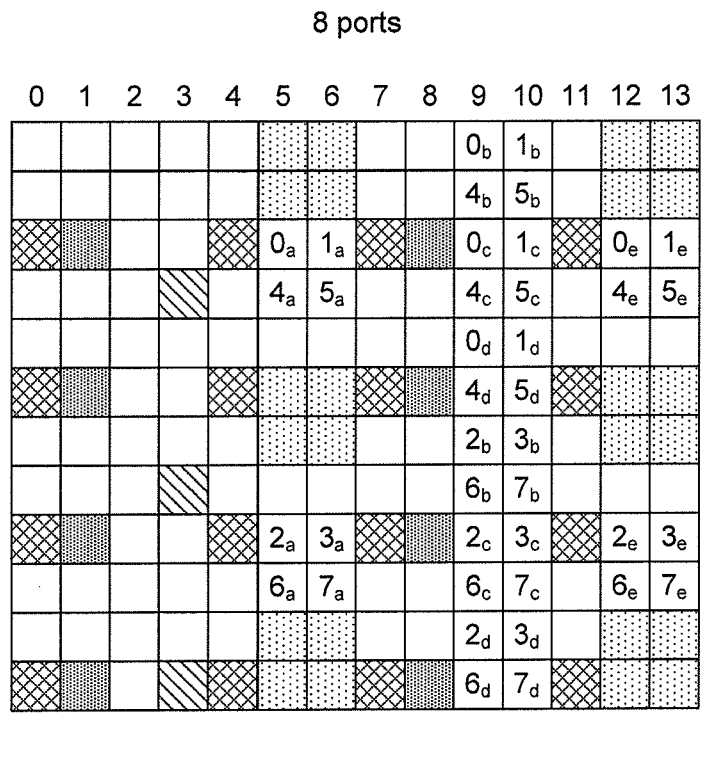
Figure 2:
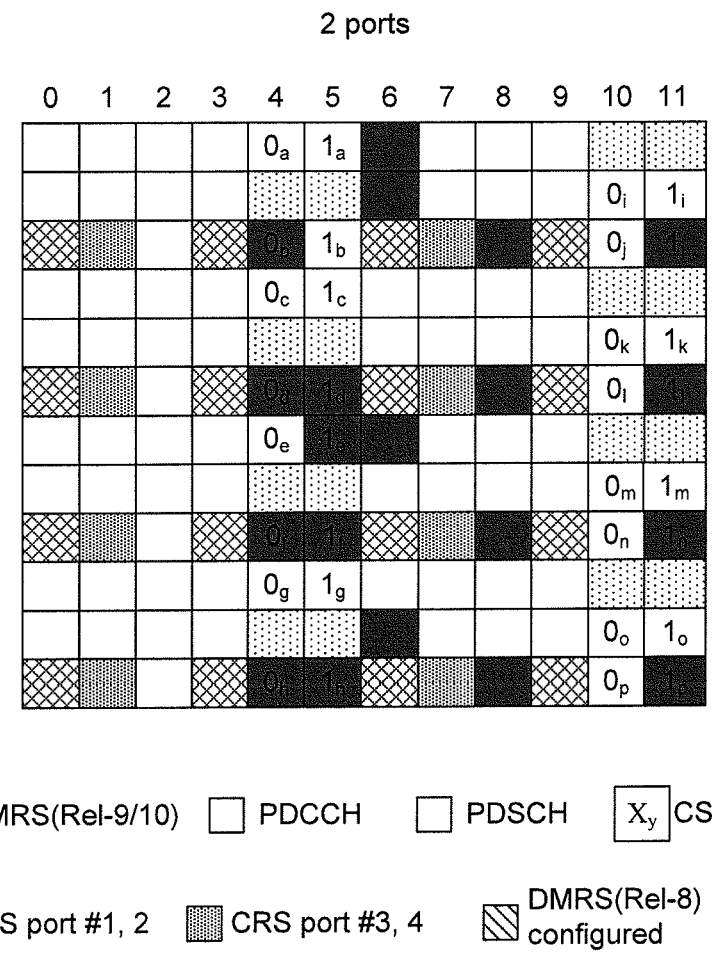
Figure 2:
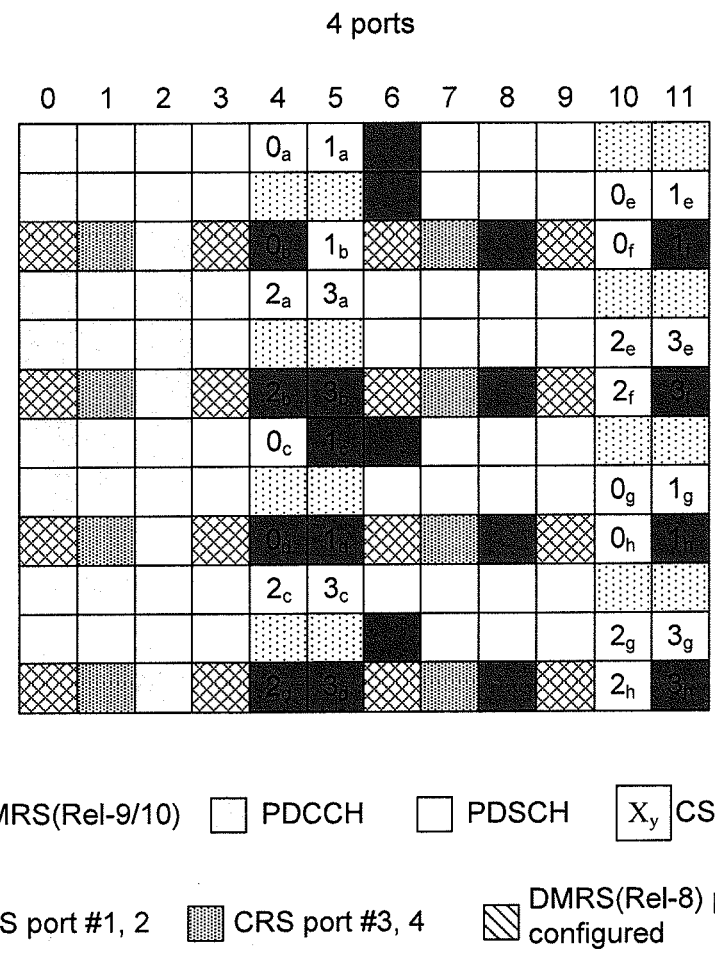
Figure 2:
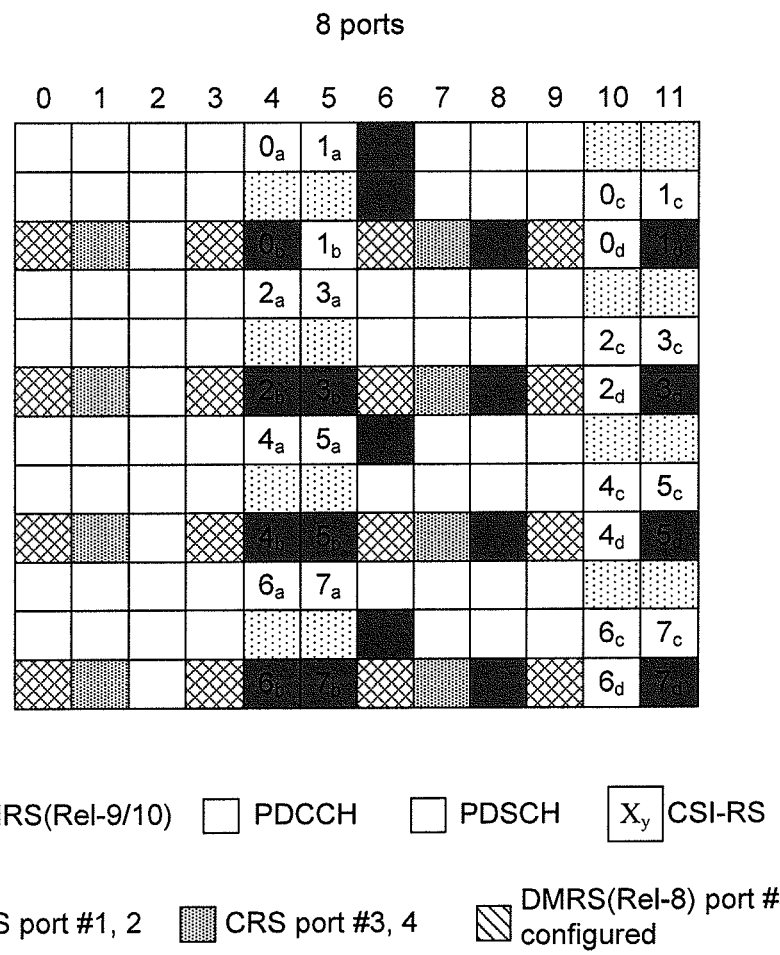
Figure 3A:
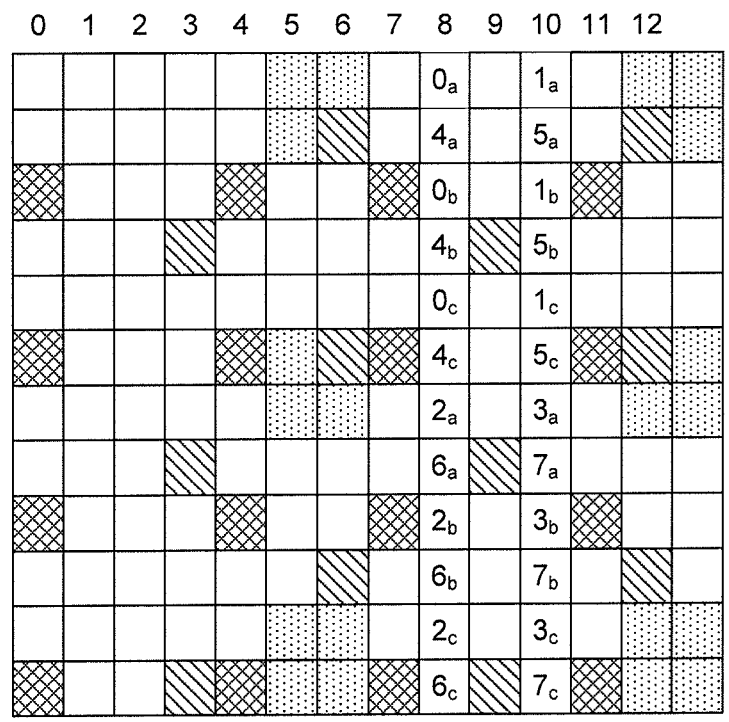
Figure 4:
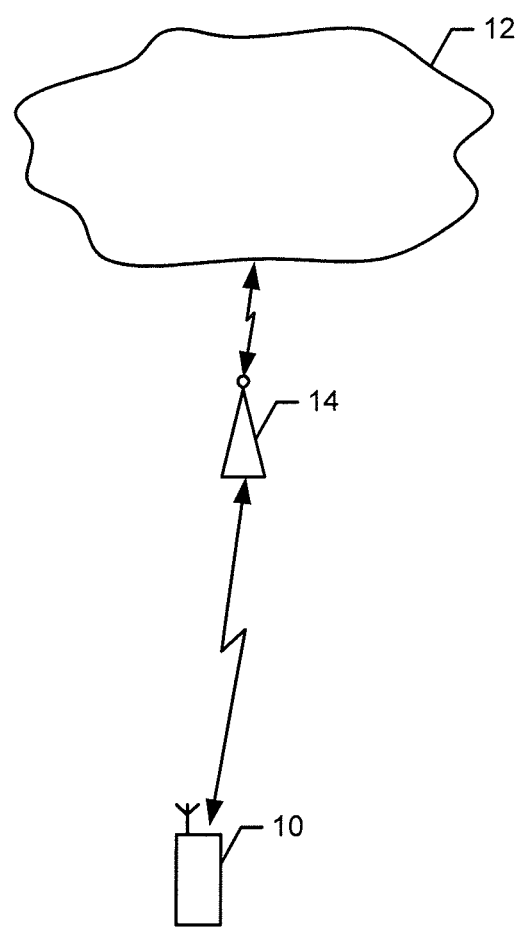
Figure 5:
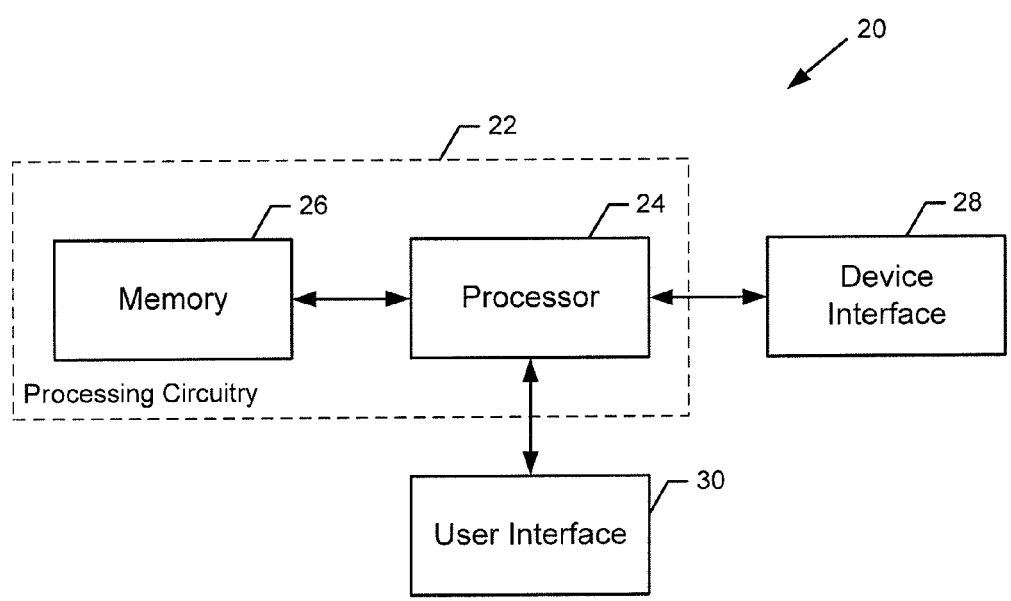
Figure 6:
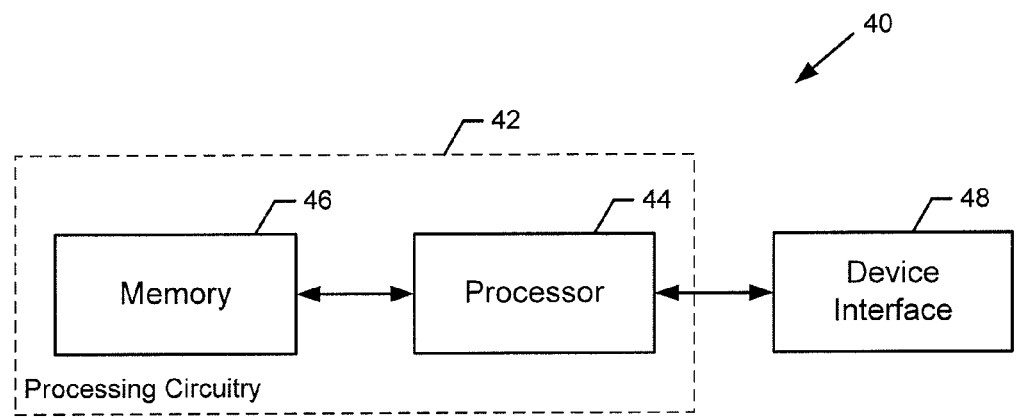
Figure 7:
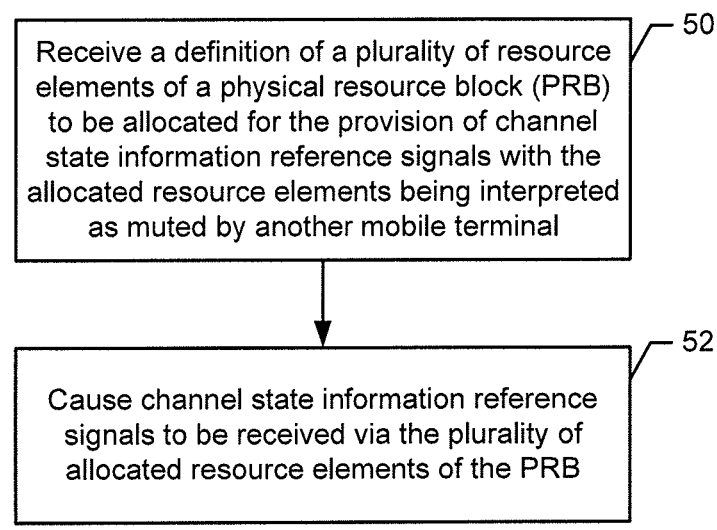
Figure 8A:
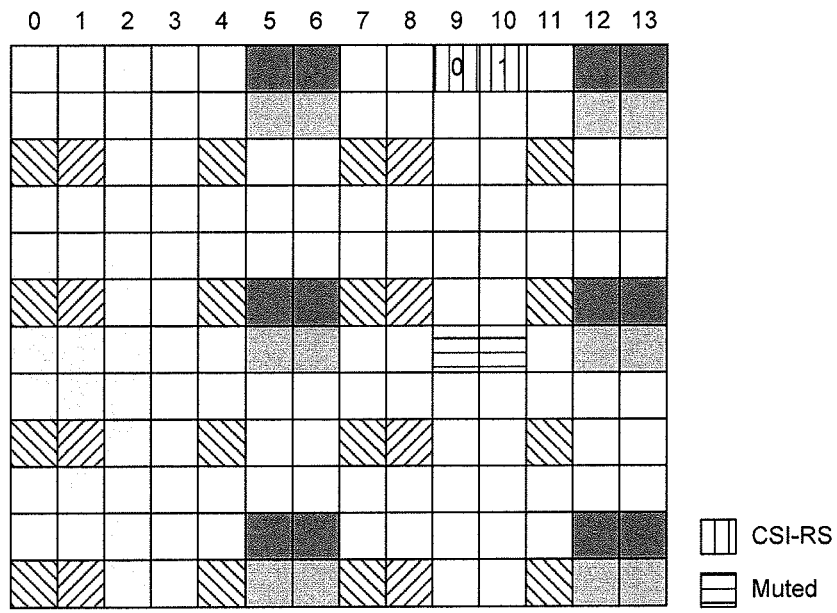
Figure 8B:
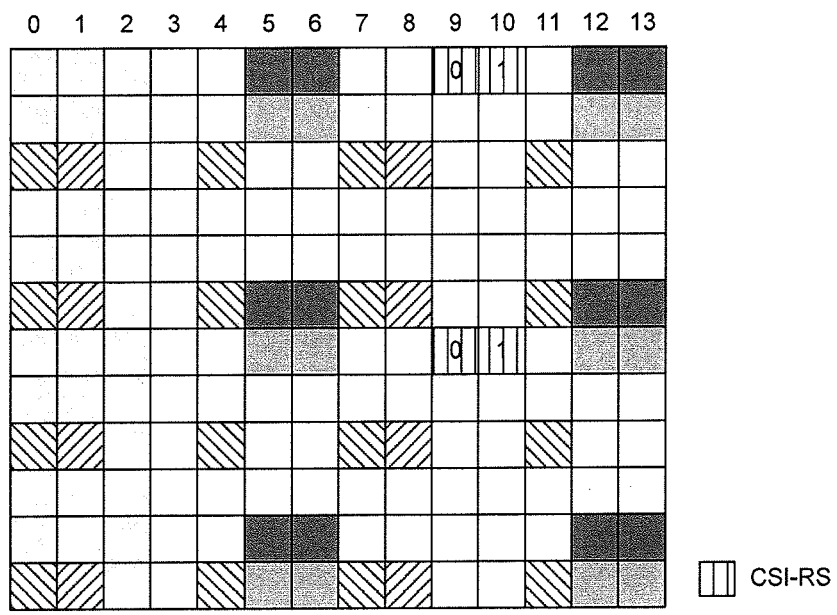
Figure 9A:
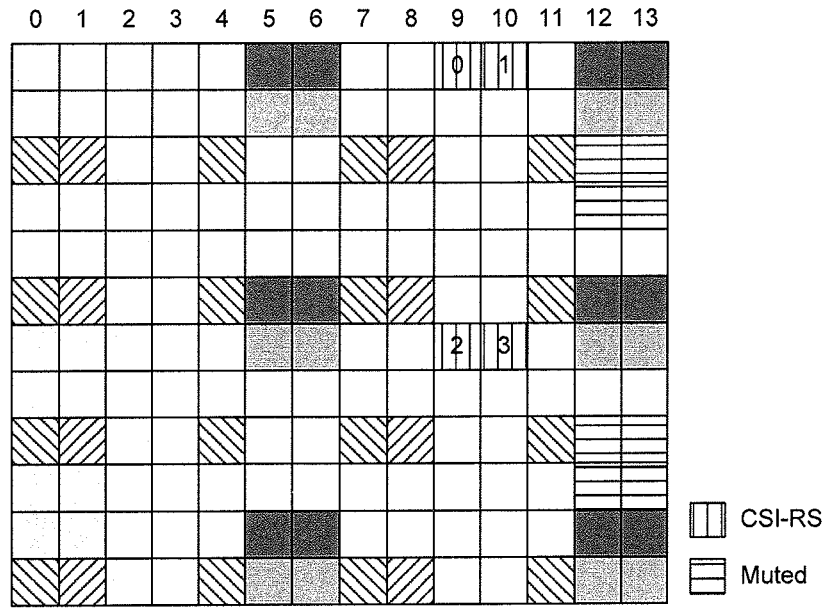
Figure 9B:
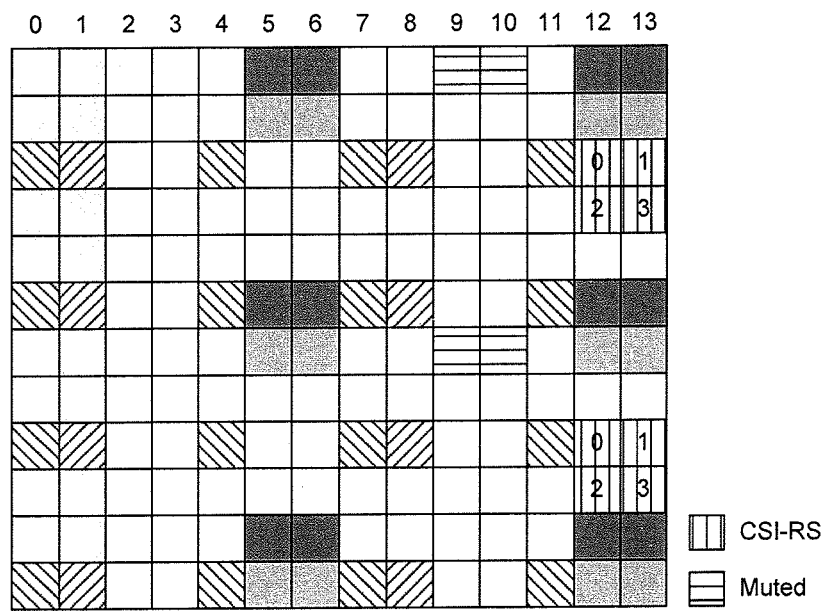
Figure 10:
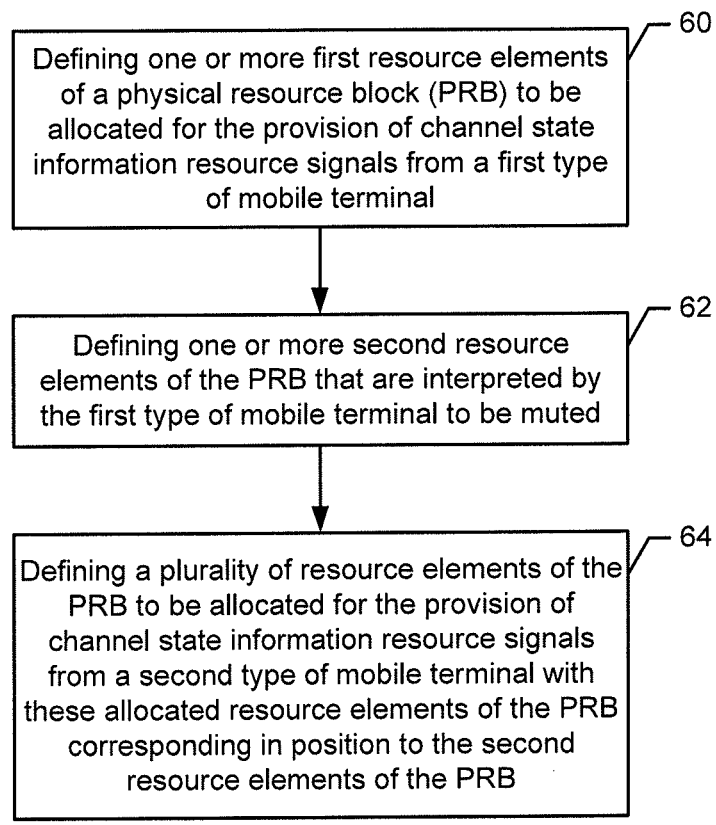

Having thus described example embodiments of the invention in general terms, reference will now be made to the accompanying drawings, which are not necessarily drawn to scale, and wherein:

FIG. 1 illustrates the physical resource blocks (PRBs) for normal CP in frame structure type 1 for a system having two antenna ports, four antenna ports and eight antenna ports;

FIG. 2 illustrates the PRBs for extended CP in frame structure type 1 for a system having two antenna ports, four antenna ports and eight antenna ports;

FIG. 3a illustrates the PRBs for a normal CP in frame structure type 2;

FIG. 3b illustrates the PRBs for an extended CP in frame structure type 2;

FIG. 4 illustrates a system including a mobile terminal and a base station configured to support communications in accordance with one embodiment of the present invention;

FIG. 5 is a block diagram of a mobile terminal in accordance with one embodiment of the present invention;

FIG. 6 is a block diagram of a base station or other network element in accordance with one embodiment of the present invention;

FIG. 7 is a flow chart illustrating the operations performed from the perspective of a mobile terminal in accordance with one embodiment of the current invention;

FIG. 8a is the PRB that is defined for a legacy mobile\terminal having one or two antenna ports in accordance with one embodiment of the present invention;

FIG. 8b is the PRB that is defined for a mobile terminal having one or two antenna ports in accordance with one embodiment of the present invention;

FIG. 9a is the PRB that is defined for a legacy mobile\terminal having four antenna ports in accordance with one embodiment of the present invention;

FIG. 9b is the PRB that is defined for a mobile terminal having four antenna ports in accordance with one embodiment of the present invention; and FIG. 10 is a flow chart illustrating the operations performed from the perspective of a base station or other network element in accordance with one embodiment of the current invention.

DETAILED DESCRIPTION OF THE INVENTION

The present invention now will be described more fully hereinafter with reference to the accompanying drawings, in which some, but not all, embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

A method, apparatus and computer program product are disclosed for defining a plurality of resource elements for the provision of channel state information reference signals. In this regard, the method, apparatus and computer program product of some example embodiments define the plurality of resource elements for the provision of channel state information reference signals without interfering with the operation of legacy mobile terminals. Although the method, apparatus and computer program product may be implemented in a variety of different systems, one example of such a system is shown in FIG. 4, which includes a first communication device (e.g., mobile terminal 10) that is capable of communication with a network 12 (e.g., a core network) via a transmit point 14 (e.g., an evolved Node B (eNB) or an array of antennas connected to an eNB). While the network may be configured in accordance with LTE or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 12 may include a collection of various different nodes, devices or functions that may be in communication with each other via corresponding wired and/or wireless interfaces. For example, the network may include one or more transmit points 14, each of which may serve a coverage area divided into one or more cells. The transmit points or other communication node could be, for example, part of one or more cellular or mobile networks or public land mobile networks (PLMNs). In turn, other devices such as processing devices (e.g., personal computers, server computers or the like) may be coupled to the mobile terminal and/or the second communication device via the network.

A communication device, such as the mobile terminal 10 (also known as user equipment (UE)), may be in communication with other communication devices or other devices via the transmit point 14 and, in turn, the network 12. In some cases, the communication device may include an antenna for transmitting signals to and for receiving signals from a transmit point.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal may also include communication circuitry and corresponding hardware/software to enable communication with other devices and/or the network 12.

In one embodiment, for example, the mobile terminal 10 may be embodied as or otherwise include an apparatus 20 as generically represented by the block diagram of FIG. 5. In the context of a mobile terminal, the apparatus may be configured to define a plurality of resource elements for the provision of channel state information reference signals. While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 5, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms.

The device interface 28 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 12 and/or any other device or module in communication with the processing circuitry 22. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As noted above, a transmit point 14 or other network entity may be configured to communicate with the mobile terminal 10. In some cases, the transmit point may include an antenna or an array of antennas for transmitting signals to and for receiving signals from the mobile terminal. The transmit point may be embodied as a base station or may be communicably connected to a base station that may include one or more processors that may define processing circuitry either alone or in combination with one or more memories. The processing circuitry may utilize instructions stored in the memory to cause the base station to operate in a particular way or execute specific functionality when the instructions are executed by the one or more processors. The transmit point may also include communication circuitry and corresponding hardware/software to enable communication with the mobile terminal and/or the network 12.

In one embodiment in which the transmit point 14 is in communication with a base station, such as an eNB, an access point or the like, the base station may be embodied as or otherwise include an apparatus 40 as generically represented by the block diagram of FIG. 6. While the apparatus may be employed, for example, by a base station, it should be noted that the components, devices or elements described below may not be mandatory and thus some may be omitted in certain embodiments. Additionally, some embodiments may include further or different components, devices or elements beyond those shown and described herein.

As shown in FIG. 6, the apparatus 40 may include or otherwise be in communication with processing circuitry 42 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 42 may include a processor 44 and memory 46 that may be in communication with or otherwise control a device interface 48. As such, the processing circuitry may be embodied as a circuit chip (e.g., an integrated circuit chip) configured (e.g., with hardware, software or a combination of hardware and software) to perform operations described herein. However, in some embodiments taken in the context of the base station, the processing circuitry may be embodied as a portion of a base station or other network entity.

The device interface 48 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 12 and/or any other device or module in communication with the processing circuitry 42. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 46 may include one or more non-transitory memory devices such as, for example, volatile and/or non-volatile memory that may be either fixed or removable. The memory may be configured to store information, data, applications, instructions or the like for enabling the apparatus 40 to carry out various functions in accordance with example embodiments of the present invention. For example, the memory could be configured to buffer input data for processing by the processor 44. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 44 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 46 or otherwise accessible to the processor. As such, whether configured by hardware or by a combination of hardware and software, the processor may represent an entity (e.g., physically embodied in circuitry—in the form of processing circuitry 42) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Referring now to FIGS. 7 and 10, flowcharts illustrating the operations performed by a method, apparatus and computer program product, such as apparatus 20 of FIG. 3 in regards to FIG. 7 and apparatus 40 of FIG. 4 in regards to FIG. 10, in accordance with one embodiment of the present invention are illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 7 and 10, when executed, convert a computer or processing circuitry into a particular machine configured to perform an example embodiment of the present invention. Accordingly, the operations of each of FIGS. 7 and 10 define an algorithm for configuring a computer or processing circuitry, e.g., processor 24, to perform an example embodiment. In some cases, a general purpose computer may be provided with an instance of the processor which performs the algorithm of a respective one of FIGS. 7 and 10 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

According to embodiments of the present invention, the interpretation of certain REs of a PRB as being muted, such as in accordance with PDSCH RE muting, by a first type of mobile terminal, such as a legacy mobile terminal, e.g., a mobile terminal operating in accordance with Release 10 of the LTE specification, may be leveraged in order to increase the density within the PRB of the reference signal resource elements for a second type of mobile terminals 10, such as mobile terminals configured in accordance with Release 11 or beyond of the LTE specification. The increased density of the reference signal resource elements may provide increased opportunities for the provision of channel state information, such as via CSI-RS, from the transmit point 14 to the second type of mobile terminal 10, without creating additional interference for the first type of mobile terminals, i.e. legacy mobile terminals.

As shown in FIG. 7 from the perspective of a second type of mobile terminal 10, such as mobile terminal configured to operate in accordance Release 11 or beyond of the LTE specification, the apparatus 20 of FIG. 5 may include a processing system, such as the processing circuitry 22, the processor 24, the device interface 28 or the like, for receiving a definition of a plurality of resource elements of a physical resource block (PRB) to be allocated for the provision of channel state information reference signals. In this regard, the plurality of resource elements allocated for the provision of channel state information reference signals may be resource elements that are allocated for CSI-RS, such as to provide channel estimation, interference information and the like. Thereafter, the processing system, in the form of the processing circuitry 22, the processor 24, the device interface 28 or the like, is arranged to cause channel state information estimation to be provided via the plurality of allocated resource elements of the PRB, as shown in block 52 of FIG. 7.

In accordance with embodiments of the present invention, at least some of the plurality of resource elements of the PRB that are allocated for the provision of channel state information reference signals correspond in position within the PRB to resource elements of the PRB that will be interpreted by a different type of mobile terminal, e.g., the first type of mobile terminal, to be muted so that the different type of mobile terminal (an aforementioned legacy mobile terminal) receives its PDSCH accordingly. As regards the correspondence in position of the resource elements, at least some of the plurality of resource elements of the PRB that are allocated for the provision of channel state information reference signals may have identical positions within the PRB to the resource elements of the PRB that will be interpreted as being muted by a different type of mobile terminal. Thus, at least some of the resource elements that will be interpreted as CSI-RS by the second type of mobile terminal will be interpreted to be muted by a different type of mobile terminal, such as the first type of mobile terminal.

In one embodiment, some, but not all, of the plurality of resource elements of the PRB that are allocated, from the perspective of the second type of mobile terminal, to the provision of channel state information reference signals have identical positions within the PRB to the resource elements of the PRB that will be interpreted as being muted by the different type of mobile terminal. In this embodiment, some of the plurality of resource elements within the PRB may be interpreted by each of the mobile terminals, such as the mobile terminals configured in accordance with both Release 10 and Release 11 or beyond of the LTE specifications, to be allocated for the provision of channel state information reference signals. Thus, each of the plurality of resource elements of the PRB that are allocated, from the perspective of the second type of mobile terminal, to the provision of channel state information reference signals may have identical positions within the PRB to respective resource elements of the PRB that are interpreted by a different type of mobile terminal to be either muted or to also be allocated for the provision of channel state information reference signals.

FIGS. 8A and 8B illustrate the same PRB with FIG. 8A depicting the interpretation or definition of the PRB from the perspective of a first type of mobile terminal, such as a Release 10 mobile terminal, and FIG. 8B depicting the interpretation or definition of the PRB from the perspective of a second type of mobile terminal, such as a Release 11 or beyond mobile terminal. As shown in FIG. 8A, the PRB as interpreted by a first type of mobile terminal, such as a Release 10 mobile may include two resource elements that are interpreted to be muted. Additionally, the PRB of the first type of mobile terminal includes two resource elements allocated for the provision of channel state information reference signals, such as CSI-RS elements. Since the transmit point 14 includes two transmit antennas in this embodiment, the PRB of the first type of mobile terminal includes two CSI-RS resource elements.

Additionally, the PRB as interpreted by a mobile terminal 10 in accordance with an example embodiment of the present invention, such as a second type of mobile terminal, e.g., a Release 11 or subsequent mobile terminal, is shown in FIG. 8B. In this regard, the PRB includes a plurality of resource elements that are allocated for the provision of channel state information reference signals, such as CSI-RS resource elements. These CSI-RS resource elements are positioned in the same relative position within the PRB as are the two resource elements that are interpreted by the first type of mobile terminal as being muted, as well as the two CSI-RS resource elements of the first type of mobile terminal.

Thus, a mobile terminal 10 in accordance with an embodiment of the present invention has the capacity to provide an increased number of channel state information reference signals since the PRB of the mobile terminal includes more resource elements allocated for the provision of channel state information reference signals than in the case of other mobile terminals, such as legacy Release 10 mobile terminals. However, by positioning resource elements that support the additional channel state information reference signals for a second type of mobile terminal coincident with the resource elements within the PRB that are interpreted by a first type of mobile terminal to be muted, the first type of mobile terminal will not monitor the channel state information reference signals provided by the mobile terminal in accordance with an example embodiment of the present invention within the corresponding muted resource elements, thereby avoiding interference or other confusion.

In one embodiment, at least some of the plurality of reference signal resource elements of the PRB of the mobile terminal 10 are spaced uniformly within the PRB. As shown in FIG. 8B, for example, the resource elements that are allocated for channel state information reference signals are evenly spaced in frequency so as to facilitate provision of channel state information reference signals. Alternatively, the reference signal resource elements may be staggered within the PRB so as not to be uniformly spaced within the PRB As another example, FIGS. 9A and 9B illustrate the same PRB with FIG. 9A depicting the interpretation or definition of the PRB from the perspective of a first type of mobile terminal, such as a Release 10 mobile terminal, and FIG. 9B depicting the interpretation or definition of the PRB from the perspective of a second type of mobile terminal, such as a Release 11 mobile terminal. With reference to FIG. 9A, the PRB may be interpreted by a first type of mobile terminal, such as a legacy mobile terminal, to include a plurality of resource elements allocated for the provision of channel state information reference signals, such as CSI-RS resource elements, and a plurality of resource elements that are muted. As shown in FIG. 9B, the PRB may be interpreted by a mobile terminal 10 of an example embodiment of the present invention to include reference signal resource elements that correspond, such as by being identically positioned within the PRB, to resource elements of the PRB that are interpreted by the first type of mobile terminal to be muted. In contrast to the embodiment of FIG. 8B, the embodiment of FIG. 9B defines the resource elements of the PRB, as interpreted by the mobile terminal of the example embodiment, that are allocated for the provision of channel state information reference signals, such as by having identical positions, to the resource elements of the PRB that are interpreted by the first type of mobile terminal to be muted. In this regard, the PRB as interpreted by the mobile terminal of the example embodiment does not define any resource elements that are allocated for the provision of channel state information reference signals to be positioned so as to correspond with the resource elements of the PRB that are interpreted by the first type of mobile terminal to also be allocated for the provision of channel state information reference signals. Instead, the PRB, as interpreted by the mobile terminal of the example embodiment, may interpret the resource elements that do correspond, such as by being identically positioned within the PRB, to the resource elements that are interpreted by the first type of mobile terminal to be allocated for the provision of channel state information reference signals to be muted so as to avoid any interference or confusion therebetween.

As shown in FIG. 10 from the perspective of a transmit point 14, a base station or other network entity, the apparatus 40 may include a processing system, such as the processing circuitry 42, the processor 44 or the like, for separately defining the manner in which a physical resource block is to be interpreted by a first type of mobile terminal, such as a legacy mobile terminal, e.g., a mobile terminal configured in accordance with Release 10 of the LTE specification, and by a second type of mobile terminal, such as a mobile terminal in accordance with Release 11 or subsequent releases of the LTE specification. As shown in block 60 of FIG. 10, the processing system may be arranged to define one or more first resource blocks of the PRB to be allocated for the provision of channel state information reference signals from the first type of mobile terminal. For example, the first type of mobile terminal may interpret the PRB so as to define one or more CSI-RS resource elements.

Additionally, the apparatus 40 may include a processing system, such as the processing circuitry 42, the processor 44 or the like, for defining one or more second resource elements of the PRB that are interpreted by the first type of mobile terminal to be muted. See block 62 of FIG. 10. Additionally, the processing system may be arranged to define a plurality of resource elements of the PRB to be allocated for the provision of channel state information reference signals from a second type of mobile terminal, such as a mobile terminal 10 configured to operate in accordance with Release 11 of the LTE specification. See block 64 of FIG. 10. In this regard, these allocated resource elements of the PRB may correspond in position to the second resource elements of the PRB as interpreted by the first type of a mobile terminal, such as described above in conjunction with FIGS. 7-9. As described above, the resource elements of the PRB that are allocated for the provision of channel state information reference signals from the second type of mobile terminal may all be positioned so as to correspond, such as by being identically positioned within the PRB, to the second resource elements of the PRB that are interpreted by the first type of mobile terminal to be muted. Or, some of the resource elements of the PRB that are allocated for the provision of channel state information reference signals from the second type of mobile terminal may be positioned so as to correspond, such as by being identically positioned, to the second resource elements of the PRB that are interpreted by the first type of terminal to be muted, while other resource elements of the PRB that are allocated for the provision of channel state information from the second type of mobile terminal may be positioned so as to correspond, such as by being identically positioned, with the first and/or second resource elements of the PRB, such as shown in FIG. 9B.

By aligning the resource elements of the PRB that are allocated for the provision of channel state information reference signals from the second type of mobile terminal 10 with resource elements of the PRB that are interpreted by the first type of mobile terminal to be either muted or to also be allocated for the provision of channel state information reference signals, the methods, apparatus and computer program products of embodiments of the present invention may reduce or eliminate instances in which interference or other confusion is created by avoiding or preventing receipt of the channel state information reference signals from the second type of mobile terminal by the first type of mobile terminal.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of configuring resource elements for provision of channel state information reference signals, the method comprising:
    receiving a definition of a plurality of resource elements of a physical resource block (PRB) to be allocated for the provision of channel state information reference signals for a mobile terminal, wherein at least some of the plurality of resource elements of the PRB that are allocated for the provision of channel state information reference signals correspond in position to resource elements of the PRB that are configured to be interpreted as muted by a different type of mobile terminal; and
    receiving channel state information reference signals via the plurality of resource elements of the PRB that are allocated for the provision of channel state information reference signals,
    wherein a density, per antenna port of the mobile terminal, of the plurality of resource elements of the PRB allocated for the provision of channel state information reference signals for the mobile terminal is greater than a density, per antenna port of the different type of mobile terminal, of resource elements of the PRB that are allocated for channel state information reference signals for the different type of mobile terminal.

2. The method according to claim 1, wherein some of the plurality of resource elements of the PRB that are allocated for the provision of channel state information reference signals have identical positions within the PRB to resource elements of the PRB that are configured to be interpreted by the different type of mobile terminal as allocated for provision of channel state information reference signals for the different type of mobile terminal.

3. The method according to claim 1, wherein each of the plurality of resource elements of the PRB that is allocated for the provision of channel state information reference signals has an identical position within the PRB to a respective resource element of the PRB that is configured to be interpreted by the different type of mobile terminal to be either muted or allocated for provision of channel state information reference signals for the different type of mobile terminal.

4. Apparatus for configuring resource elements for provision of channel state information reference signals, the apparatus comprising a processing system arranged to:
    receive a definition of a plurality of resource elements of a physical resource block (PRB) to be allocated for the provision of channel state information reference signals for a mobile terminal, wherein at least some of the plurality of resource elements of the PRB that are allocated for the provision of channel state information reference signals correspond in position to resource elements of the PRB that are configured to be interpreted as muted by a different type of mobile terminal; and
    receive channel state information reference signals via the plurality of resource elements of the PRB that are allocated for the provision of channel state information reference signals,
    wherein a density, per antenna port of the mobile terminal, of the plurality of resource elements of the PRB allocated for the provision of channel state information reference signals for the mobile terminal is greater than a density, per antenna port of the different type of mobile terminal, of resource elements of the PRB that are allocated for channel state information reference signals for the different type of mobile terminal.

5. The apparatus according to claim 4, wherein some of the plurality of resource elements of the PRB that are allocated for the provision of channel state information reference signals have identical positions within the PRB to resource elements of the PRB that are configured to be interpreted by the different type of mobile terminal as allocated for provision of channel state information reference signals for the different type of mobile terminal.

6. The apparatus according to claim 4, wherein each of the plurality of resource elements of the PRB that is allocated for the provision of channel state information reference signals has an identical position within the PRB to a respective resource element of the PRB that is configured to be interpreted by the different type of mobile terminal to be either muted by the different type of mobile terminal or allocated for provision of channel state information reference signals for the different type of mobile terminal.

7. The apparatus according claim 4, wherein the apparatus comprises a mobile terminal.

8. The apparatus according to claim 7, comprising a device interface configured to communicate with a base station in order to receive the definition of the plurality of resource elements of the PRB to be allocated for provision of channel state information reference signals.

9. The apparatus according to claim 7, wherein the processing system is configured for use in a Long Term Evolution (LTE) system.

10. A method of configuring resource elements for provision of channel state information reference signals, the method comprising:
  defining one or more first resource elements of a physical resource block (PRB) to be allocated for the provision of channel state information reference signals for a first type of mobile terminal;
  defining one or more second resource elements of the PRB to be interpreted as muted by the first type of mobile terminal; and
  defining a plurality of resource elements of the PRB to be allocated for provision of channel state information reference signals for a second type of mobile terminal,
  wherein at least some of the plurality of resource elements of the PRB that are allocated for the provision of channel state information reference signals for the second type of mobile terminal correspond in position to the second resource elements of the PRB, and
  wherein a density, per antenna port of the second type of mobile terminal, of the plurality of resource elements of the PRB allocated for the provision of channel state information reference signals for the second type of mobile terminal is greater than a density, per antenna port of the first type of mobile terminal, of resource elements of the PRB that are allocated for channel state information reference signals for the first type of mobile terminal.

11. The method according to claim 10, wherein some of the plurality of resource elements of the PRB that are allocated for the provision of channel state information reference signals for the second type of mobile terminal have identical positions within the PRB to the first resource elements of the PRB.

12. The method according to claim 10, wherein each of the plurality of resource elements of the PRB that is allocated for the provision of channel state information reference signals for the second type of mobile terminal has an identical position within the PRB to a respective one of the first or second resource elements of the PRB.

13. Apparatus for configuring resource elements for provision of channel state information reference signals, the apparatus comprising a processing system arranged to:
  define one or more first resource elements of a physical resource block (PRB) to be allocated for the provision of channel state information reference signals for a first type of mobile terminal;
  define one or more second resource elements of the PRB to be interpreted as muted by the first type of mobile terminal; and
  define a plurality of resource elements of the PRB to be allocated for provision of channel state information reference signals for a second type of mobile terminal,
  wherein at least some of the plurality of resource elements of the PRB that are allocated for the provision of channel state information reference signals for the second type of mobile terminal correspond in position to the second resource elements of the PRB, and
  wherein a density, per antenna port of the second type of mobile terminal, of the plurality of resource elements of the PRB allocated for the provision of channel state information reference signals for the second type of mobile terminal is greater than a density, per antenna port of the first type of mobile terminal, of resource elements of the PRB that are allocated for channel state information reference signals for the first type of mobile terminal.

14. The apparatus according to claim 13, wherein some of the plurality of resource elements of the PRB that are allocated for the provision of channel state information reference signals for the second type of mobile terminal have identical positions within the PRB to the first resource elements of the PRB.

15. The apparatus according to claim 13, wherein each of the plurality of resource elements of the PRB that is allocated for the provision of channel state information reference signals for the second type of mobile terminal has an identical position within the PRB to a respective one of the first or second resource elements of the PRB.

16. The apparatus according to claim 13, wherein the processing system is arranged to define the plurality of resource elements of the PRB as interpreted by the second type of mobile terminal by spacing at least some of the resource elements uniformly within the PRB of the second type of mobile terminal.

17. The apparatus according to claim 13, wherein the processing system is arranged to define the plurality of resource elements of the PRB as interpreted by the second type of mobile terminal by spacing at least some of the resource elements non-uniformly within the PRB of the second type of mobile terminal.

18. The apparatus according to claim 13, wherein the apparatus comprises a base station.

19. The apparatus according to claim 18, comprising a device interface configured to communicate with a plurality of mobile terminals including provision of definitions of the PRBs to the first and second types of mobile terminals.

20. The apparatus according to claim 18, wherein the processing system is configured for use in a Long Term Evolution (LTE) system.

* * * * *